(12) United States Patent
Kisaichi et al.

(10) Patent No.: US 10,514,000 B2
(45) Date of Patent: Dec. 24, 2019

(54) ENGINE SIDE COVER STRUCTURE OF SADDLE TYPE VEHICLE

(71) Applicant: HONDA MOTOR CO., LTD., Minato-Ku, Tokyo (JP)

(72) Inventors: Toru Kisaichi, Wako (JP); Hiroyuki Kaga, Wako (JP); Tomoya Matsuo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 123 days.

(21) Appl. No.: 15/714,407

(22) Filed: Sep. 25, 2017

(65) Prior Publication Data

US 2018/0087472 A1    Mar. 29, 2018

(30) Foreign Application Priority Data

Sep. 29, 2016   (JP) ................................ 2016-192135

(51) Int. Cl.
   *F02F 7/00*   (2006.01)
   *B62K 11/04*  (2006.01)
   (Continued)

(52) U.S. Cl.
   CPC .............. *F02F 7/008* (2013.01); *B62K 11/04* (2013.01); *B62K 21/02* (2013.01); *B62M 7/06* (2013.01);
   (Continued)

(58) Field of Classification Search
   CPC ......... F02F 7/008; B62K 11/04; B62K 21/02; B62M 7/06; F02B 61/02; F02B 77/13
   (Continued)

(56) References Cited

U.S. PATENT DOCUMENTS

| 4,396,085 A | 8/1983 | Inoue et al. |
| 4,913,256 A * | 4/1990 | Sakuma ................... B62J 17/00 180/229 |

(Continued)

FOREIGN PATENT DOCUMENTS

| EP | 1 950 457 A2 | 7/2008 |
| EP | 2949567 A1 * | 12/2015 .............. B62M 7/04 |

(Continued)

OTHER PUBLICATIONS

Extended European search report dated Feb. 7, 2018 in the corresponding EP patent application 17194204.8.
(Continued)

*Primary Examiner* — Jacob D Knutson
(74) *Attorney, Agent, or Firm* — Carrier Blackman & Associates, P.C.; William D. Blackman; Joseph P. Carrier

(57) ABSTRACT

To provide an engine side cover structure of a saddle type vehicle that can also cover the back side of a crankcase. An engine side cover structure of a saddle type vehicle includes a vehicle body frame arranged between a front wheel and a rear wheel; an engine including a crankcase, and a cylinder extending upward from the crankcase, the engine being supported by the vehicle body frame; and a side cover covering a side of the crankcase; where the side cover includes a cover main body that covers the side of the crankcase, and an extended portion that extends backward from the cover main body; and the cover main body is fixed to the crankcase, and the extended portion is fixed to the vehicle body frame.

12 Claims, 6 Drawing Sheets

(51) Int. Cl.
  *B62K 21/02* (2006.01)
  *B62M 7/06* (2006.01)
(52) U.S. Cl.
  CPC ....... *B60Y 2200/12* (2013.01); *B60Y 2306/09* (2013.01); *F02F 7/0043* (2013.01)
(58) Field of Classification Search
  USPC ........................................................ 180/255
  See application file for complete search history.

(56) References Cited

U.S. PATENT DOCUMENTS

| | | | | |
|---|---|---|---|---|
| 6,557,438 B2 * | 5/2003 | Maeda | ................... | F01M 13/00 |
| | | | | 184/6.12 |
| 7,669,680 B2 * | 3/2010 | Hasegawa | ............. | B60T 8/3685 |
| | | | | 180/219 |
| 8,205,710 B2 | 6/2012 | Ishida | | |
| 9,580,142 B2 * | 2/2017 | Sasaki | ...................... | B62M 7/04 |
| 9,592,872 B2 * | 3/2017 | Takasaki | ................... | B62J 15/00 |
| 9,988,121 B2 * | 6/2018 | Inomata | .................... | B62J 37/00 |
| 2005/0217629 A1 * | 10/2005 | Thurm | ..................... | B62J 23/00 |
| | | | | 123/195 C |
| 2014/0060952 A1 * | 3/2014 | Mizukura | ................ | B62M 7/00 |
| | | | | 180/231 |
| 2016/0272266 A1 * | 9/2016 | Hosoya | .................... | B62J 23/00 |

FOREIGN PATENT DOCUMENTS

JP   S58-178090 U   11/1983
JP   3808184 B2    8/2008

OTHER PUBLICATIONS

Japanese Office Action dated Aug. 7, 2018 in the corresponding patent application 2016-192135.

* cited by examiner

ENGINE SIDE COVER STRUCTURE OF SADDLE TYPE VEHICLE

BACKGROUND OF THE INVENTION (1) Field of the Invention

The present invention relates to an engine side cover structure of a saddle type vehicle.

(2) Description of the Related Art

As described in Japanese Patent No. 3808184, for example, an engine side cover structure of a saddle type vehicle including a vehicle body frame 2 arranged between a front wheel and a rear wheel, an engine 10 including a crankcase 10a and a cylinder extending upward from the crankcase 10a, the engine 10 being supported by the vehicle body frame 2, and a side cover 48 covering a side of the crankcase 10a is conventionally known.

In the conventional engine side cover structure of the saddle type vehicle described above, the side cover 48 covers only the side part of the crankcase 10a and does not cover the back side of the crankcase 10a.

The present invention aims to address the problem described above, and to provide an engine side cover structure of a saddle type vehicle that can also cover the back side of the crankcase.

SUMMARY OF THE INVENTION

In order to address the problem described above, an engine side cover structure of a saddle type vehicle of the present invention includes, a vehicle body frame arranged between a front wheel and a rear wheel;

an engine including a crankcase, and a cylinder extending upward from the crankcase, the engine being supported by the vehicle body frame; and a side cover covering a side of the crankcase; where the side cover includes a cover main body that covers the side of the crankcase, and an extended portion that extends backward from the cover main body; and the cover main body is fixed to the crankcase, and the extended portion is fixed to the vehicle body frame.

According to the engine side cover structure of the saddle type vehicle, the side cover includes the cover main body that covers the side of the crankcase and the extended portion that extends backward from the cover main body, and thus can cover not only the side of the crankcase with the cover main body but also the back side of the crankcase with the extended portion.

Furthermore, a region from the back side of the crankcase to the vehicle body frame can be covered since the cover main body is fixed to the crankcase, and the extended portion is fixed to the vehicle body frame.

Moreover, the side cover can be tightly fixed since the cover main body is fixed to the crankcase and the extended portion is fixed to the vehicle body frame.

In the engine side cover structure of the saddle type vehicle, a configuration in which the vehicle body frame includes,
- a head pipe that supports the front wheel by way of a front fork,
- a main tube that extends backward and downward from the head pipe, and
- a pivot frame that extends downward from a back end of the main tube; and the pivot frame is arranged to extend up and down at the back side of the crankcase, the extended portion being fixed to the pivot frame can be adopted.

According to such configuration, the extended portion can be fixed using the pivot frame, and thus an attachment member of the extended portion does not need to be provided.

In the engine side cover structure of the saddle type vehicle, a configuration in which the vehicle body frame includes,
- a head pipe that supports the front wheel by way of a front fork,
- a main tube that extends backward and downward from the head pipe, and
- a pivot frame that extends downward from a back end of the main tube; and an electrical component is arranged in a space, which front side is covered with the crankcase, back side is covered with the pivot frame, and outer side is covered with the extended portion at between the crankcase and the pivot frame can be adopted.

According to such configuration, the electrical component can be protected even if the electrical component is arranged in the space located on the lower side of the vehicle.

In the engine side cover structure of the saddle type vehicle, a configuration in which an opening, to which the electrical component faces, is provided on a side surface of the extended portion can be adopted.

According to such configuration, maintenance of the electrical component can be carried out through the opening.

In the engine side cover structure of the saddle type vehicle, a configuration where when an exhaust tube coupled to the cylinder is arranged to extend in a front and back direction at an upper side the crankcase, a cutout is provided at a portion adjacent to the exhaust tube at an upper part of the side cover can be adopted.

According to such configuration, the influence on the side cover of the exhaust tube that becomes a high temperature can be suppressed and the heat resistance property of the side cover does not need to be taken into consideration, and hence lower cost of the side cover can be realized.

In the engine side cover structure of the saddle type vehicle, a configuration in which a sound absorbing material is arranged between the side cover and the crankcase can be adopted.

According to such configuration, sound generated from the periphery of the crankcase is less likely to leak out to the outside.

In the engine side cover structure of the saddle type vehicle, a configuration where when the crankcase includes a bulge-out portion that bulges out outward in a vehicle width direction, the side cover includes a first cover portion that covers the bulge-out portion and a second cover portion that covers at least one part of a periphery of the bulge-out portion;

the sound absorbing material includes at least a first sound absorbing material provided on an inner surface of the first cover portion, and a second sound absorbing material provided on an inner surface of the second cover portion; and a thickness in a vehicle width direction of the first sound absorbing material is thinner than a thickness in the vehicle width direction of the second sound absorbing material can be adopted.

According to such configuration, sound generated from the periphery of the crankcase can be prevented from easily leaking to the outside, and a projection amount of the side cover in the vehicle width direction can be reduced as the thickness in the vehicle width direction of the first sound absorbing material provided on the inner surface of the first cover portion that covers the bulge-out portion bulging out outward in the vehicle width direction of the crank case is thinner than the thickness in the vehicle width direction of the second sound absorbing material provided on the inner surface of the second cover portion that covers at least one part of the periphery of the bulge-out portion.

In the engine side cover structure of the saddle type vehicle, a configuration in which a bolt insertion hole is formed in the extended portion, and a bolt passing through the bolt insertion hole is tightened toward the vehicle body frame side to fix the extended portion, a diameter of the bolt insertion hole being greater than a diameter of a shaft of the bolt, can be adopted.

According to such configuration, the assembly of the side cover is facilitated as an assembly error can be tolerated by a clearance between the shaft of the bolt and the bolt insertion hole.

In the engine side cover structure of the saddle type vehicle, a configuration in which an attachment bracket of the electrical component is fixed to the pivot frame and a fixing portion of the extended portion is provided on the attachment bracket can be adopted.

According to such configuration, the attachment bracket can be commonly used by the electrical component and the side cover thus reducing the number of parts, and at the same time, the fixing of the electrical component and the extended portion of the side cover can be carried out by effectively using a space which front side is covered with the crankcase, the back side with the pivot frame and the outer side with the extended portion.

In the engine side cover structure of the saddle type vehicle, a configuration in which a clip for holding a wiring cord of the electrical component is provided on the attachment bracket of the electrical component can be adopted.

According to such configuration, the attachment of the electrical component and the drawing of the wiring cord are facilitated.

DETAILED DESCRIPTION OF THE PREFERRED EMBODIMENTS

An embodiment of an engine side cover structure of a saddle type vehicle according to the present invention will be hereinafter described with reference to the drawings. The figures are to be viewed in the direction of a reference symbol, where in the following description, front and back, right and left, and up and down follow the direction viewed from an operator, the front side of the vehicle being indicated as Fr, rear or back side as Rr, left side as L, right side as R, upward or upper side as U, and downward or lower side as D in the figure, as necessary. In each figure, the same portion or the corresponding portion are denoted with the same reference symbol.

Figure 1:
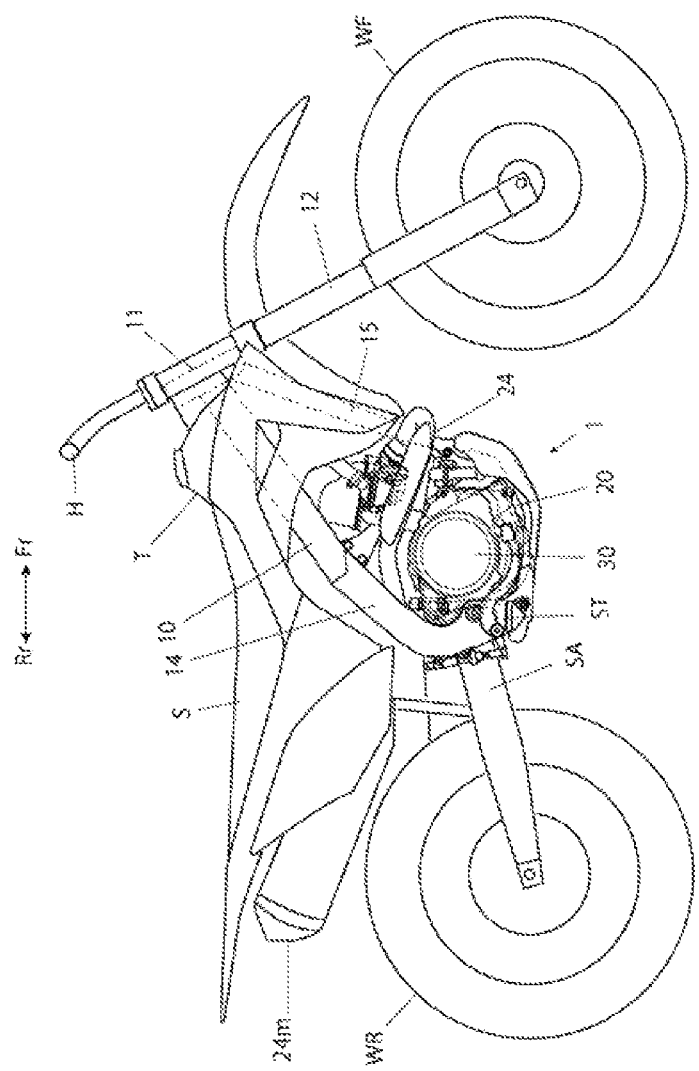
FIG. 1 is a right side view showing one example of a saddle type vehicle adopting an engine side cover structure of a saddle type vehicle according to the present invention.
Figure 2:
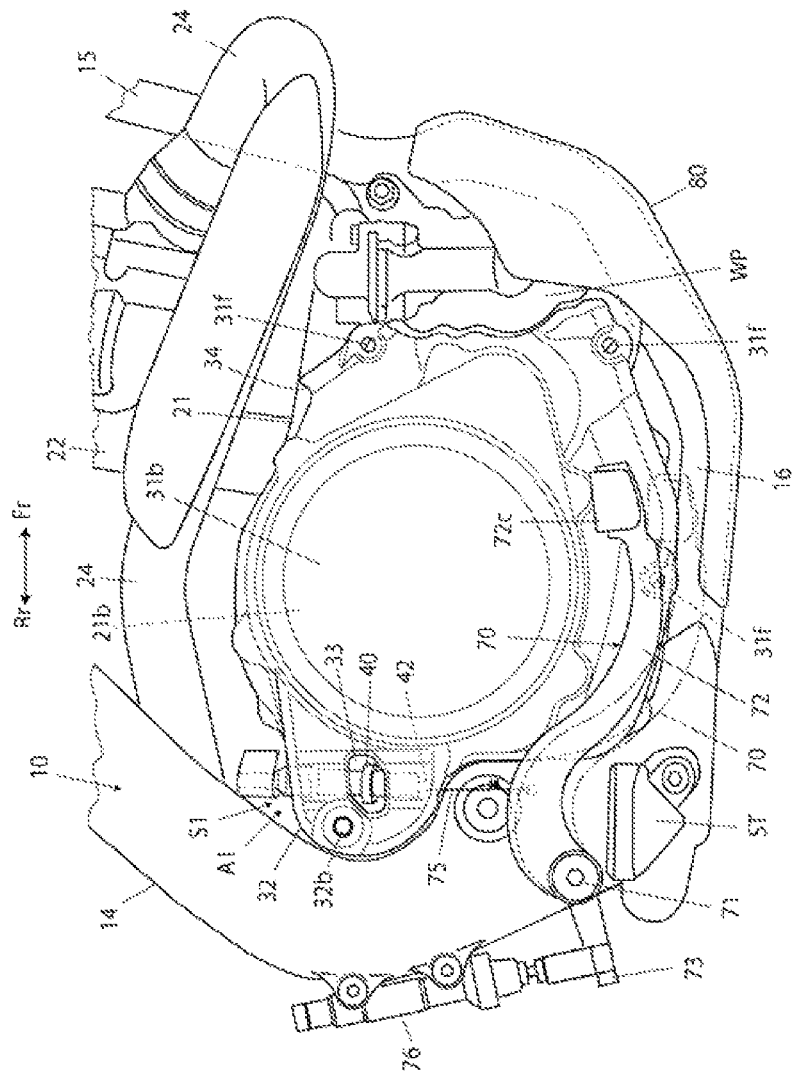
FIG. 2 is an enlarged view of a main part of FIG. 1.

An engine side cover structure 1 of a saddle type vehicle shown in FIGS. 1 and 2 includes a vehicle body frame 10 arranged between a front wheel WF and a rear wheel WR, an engine 20 including a crankcase 21 and a cylinder 22 extending upward from the crankcase 21, the engine 20 being supported by the vehicle frame 10, and a side cover 30 covering a side of the crankcase 21.

As shown in FIGS. 2 to 5, the side cover 30 includes a cover main body 31 that covers the side of the crankcase 21, and an extended portion 32 that extends backward from the cover main body 31.

The cover main body 31 is fixed to the crankcase 21, and the extended portion 32 is fixed to the vehicle body frame 10.

According to the engine side cover structure of the saddle type vehicle, the side cover 30 includes the cover main body 31 that covers the side of the crankcase 21 and the extended portion 32 that extends backward from the cover main body 31, and thus can cover not only the side of the crankcase 21 with the cover main body 31 but also the back side of the crankcase 21 with the extended portion 32.

Furthermore, the cover main body 31 is fixed to the crankcase 21 and the extended portion 32 is fixed to the vehicle body frame 10, so that a region A1 (FIGS. 2 and 4) from the back side of the crankcase 21 to the vehicle body frame 10 can be covered.

In addition, the side cover 30 can be strongly fixed since the cover main body 31 is fixed to the crankcase 21 and the extended portion 32 is fixed to the vehicle body frame 10.

As shown in FIG. 1, the vehicle body frame 10 includes a head pipe 11 that supports the front wheel WF by way of a front fork 12, a main tube 13 that extends backward and downward from the head pipe 11, a pivot frame 14 that extends downward from a back end of the main tube 13, a down frame 15 that extends downward from the head pipe 11, and a lower frame 16 that couples a lower end of the down frame 15 and a lower end of the pivot frame 14.

As shown in FIG. 2, the pivot frame 14 is arranged to extend up and down at the back side of the crankcase 21, where the extended portion 32 of the side cover 30 is fixed to the pivot frame 14.

According to such configuration, the extended portion 32 can be fixed using the pivot frame 14, and thus an attachment member of the extended portion 32 does not need to be provided.

As will be described below, the extended portion 32 may have a structure of being fixed to an attachment member (bracket) fixed to the pivot frame 14.

Figures 3A, 3B:
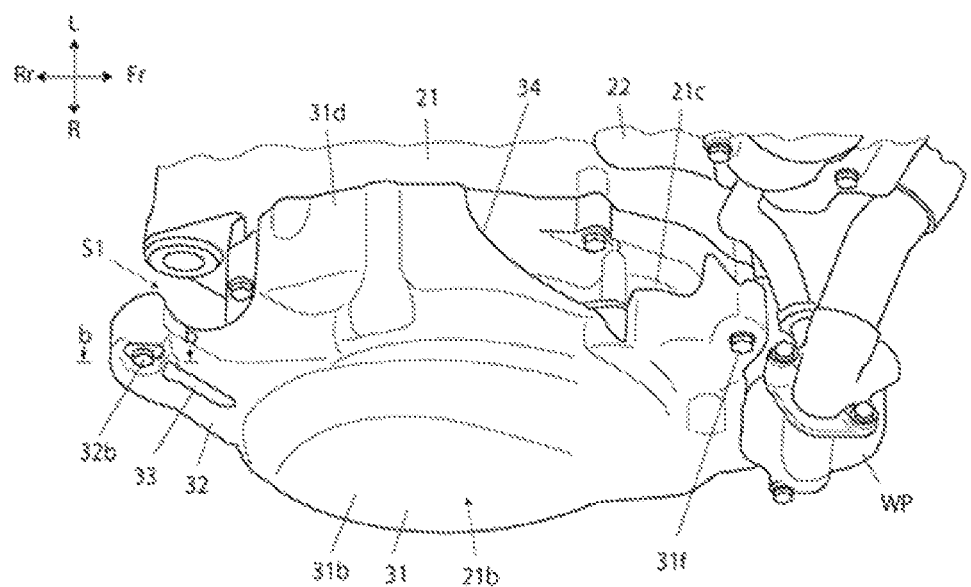
FIG. 3A is a schematic perspective view of the main part.
FIG. 3B is an end view taken along a-a in FIG. 3A.
Figure 4:
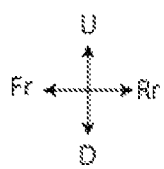
FIG. 4 is a partially omitted left side view of the main part.
Figure 4:
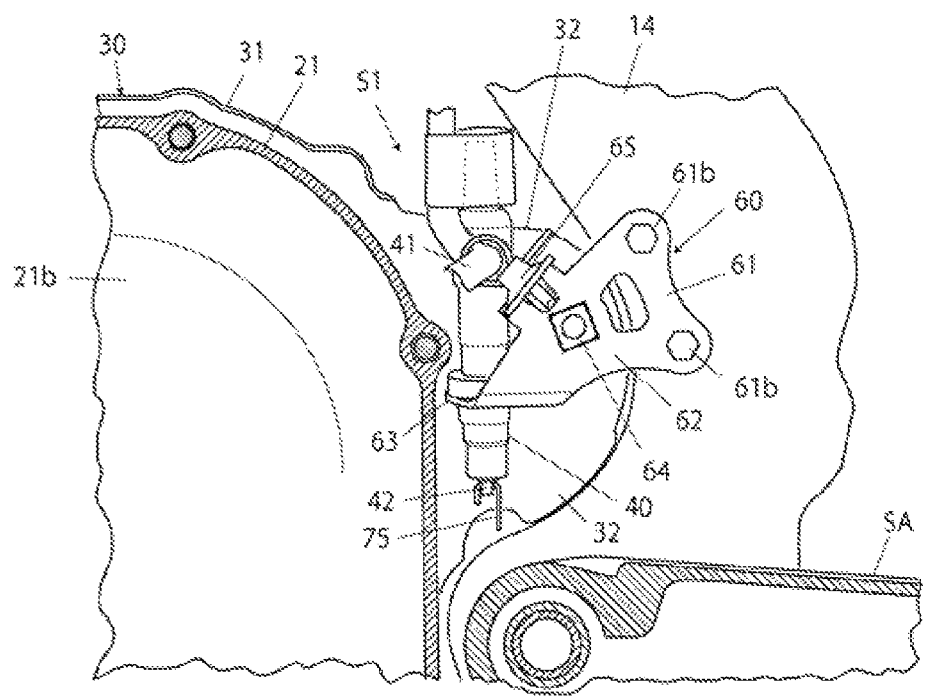

In FIGS. 2 and 4, reference numeral 40 is denoted on a brake switch, serving as an electrical component. As shown in FIGS. 2 to 4, the brake switch 40 is arranged in a space S1, which front side thereof is covered with the crankcase 21, the back side thereof is covered with the pivot frame 14, and an outer side thereof is covered with the extended portion 32 of the side cover 30, at an area between the crankcase 21 and the pivot frame 14.

According to such configuration, the electrical component 40 can be protected even if the electrical component 40 is arranged in the space S1 located on the lower side of the vehicle.

Normally, the lower side of the vehicle is not suited for the arrangement of the electrical component as gravels, and the like thrown up by the front wheel WF are often flown thereto.

However, according to the embodiment, the electrical component 40 is protected with the front side covered with the crankcase 21, the back side covered with the pivot frame 14, and the outer side covered with the extended portion 32, and thus can be arranged on the lower side of the vehicle.

As shown in FIG. 2, an opening 33 to which the electrical component 40 faces is provided on the side surface of the extended portion 32.

According to such configuration, maintenance of the electrical component 40 can be carried out through the opening 33.

As shown in FIGS. 1 and 2, an exhaust tube 24 is coupled to the cylinder 22, which exhaust tube 24 is arranged to extend in a front and back direction at an upper side of the crankcase 21.

As also shown in FIGS. 3A and 3B, a cutout 34 is formed at a portion adjacent to the exhaust tube 24 at an upper part of the side cover 30.

According to such configuration, the influence on the side cover 30 of the exhaust tube 24 that becomes a high temperature can be suppressed. Thus, the heat resistance property of the side cover 30 does not need to be taken into consideration, and lower cost of the side cover 30 can be realized.

As shown in FIGS. 3A, 3B, 6A and 6B, a sound absorbing material 50 is arranged between the side cover 30 and the crankcase 21.

According to such configuration, sound generated from the periphery of the crankcase 21 is less likely to leak out to the outside.

As shown in FIGS. 2 to 4, the crankcase 21 includes a bulge-out portion 21b that bulges out outward in a vehicle width direction.

The side cover 30 includes a first cover portion 31b that covers the bulge-out portion 21b, and a second cover portion 31c that covers at least one part 21c of the periphery of the bulge-out portion 21b.

Figure 6A:
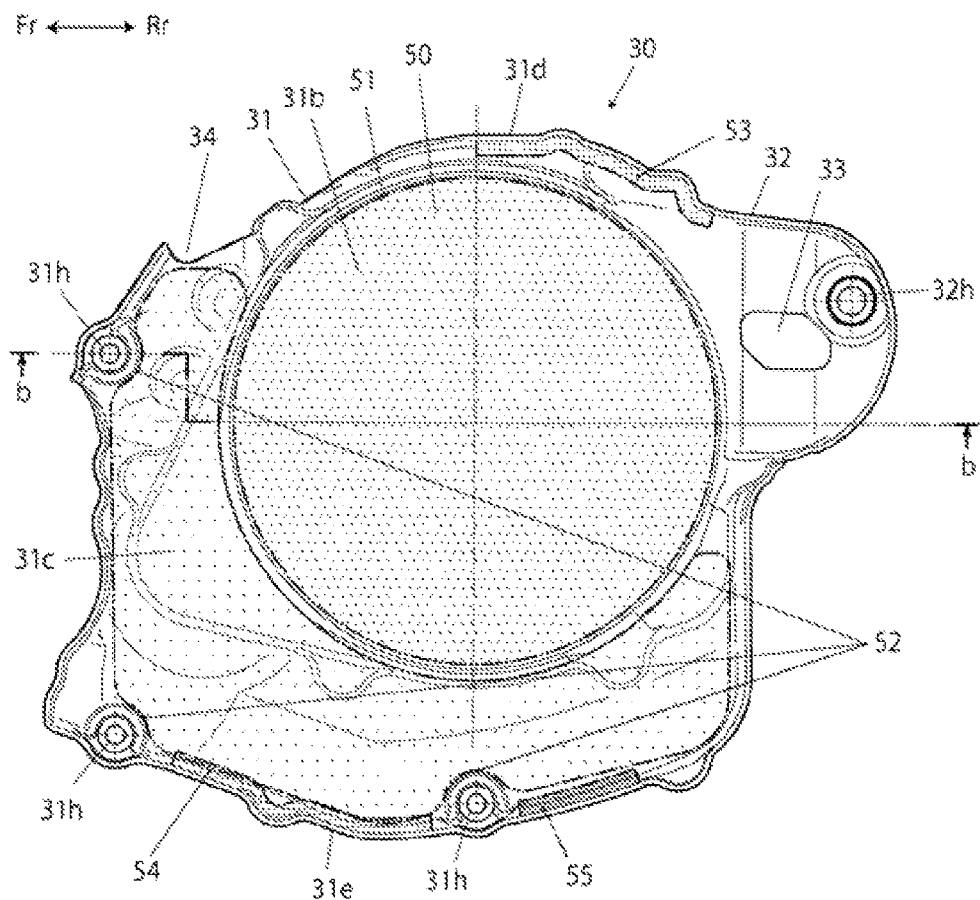
FIG. 6A is a left side view of the side cover.
Figure 6B:
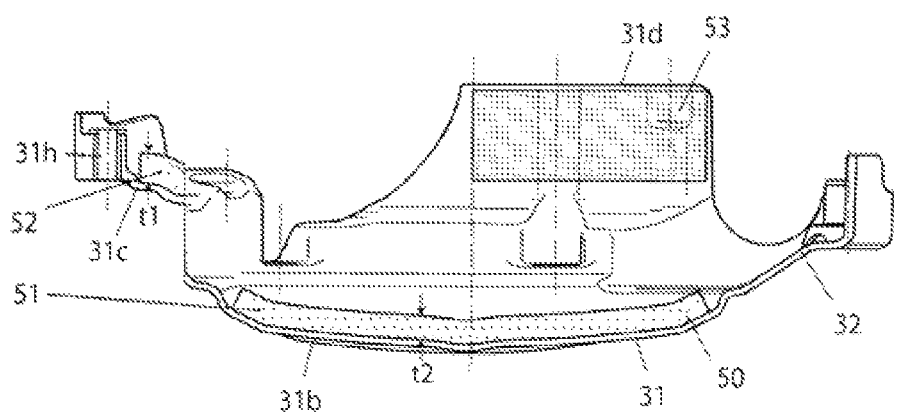
FIG. 6B is a cross-sectional view taken along b-b in FIG. 6A.

As shown in FIGS. 6A and 6B, the sound absorbing material 50 includes at least a first sound absorbing material 51 provided on an inner surface of the first cover portion 31b, and a second sound absorbing material 52 provided on an inner surface of the second cover portion 31c.

In FIG. 6A, a portion (region drawn in a pointillist manner with relatively dark density) indicated with a circular chain double dashed line 51 indicates the first sound absorbing material, and a portion (region drawn in a pointillist manner with relatively light density) indicated with a U-shaped or C-shaped chain double dashed line 52 at the periphery thereof indicates the second sound absorbing material.

As shown in FIG. 6B, a thickness t1 in the vehicle width direction of the first sound absorbing material 51 is thinner than a thickness t2 in the vehicle width direction of the second sound absorbing material 52.

According to such configuration, sound generated from the periphery of the crankcase can be prevented from easily leaking to the outside, and a projection amount of the side cover 30 in the vehicle width direction can be reduced as the thickness t1 in the vehicle width direction of the first sound absorbing material 51 provided on the inner surface of the first cover portion 31b that covers the bulge-out portion 21b bulging out outward in the vehicle width direction of the crank case 21 is thinner than the thickness t2 in the vehicle width direction of the second sound absorbing material 52 provided on the inner surface of the second cover portion 31c that covers at least one part of the periphery of the bulge-out portion 21b.

As shown in FIGS. 6A and 6B, the side cover 30 of the embodiment includes a third cover portion 31d that extends toward an inner side in the vehicle width direction at an upper side of the back part of the first cover portion 31b and covers the back side of the upper part of the crankcase 21, and a fourth cover portion 31e that extends toward the inner side in the vehicle width direction at the lower side of the first cover portion 31b and covers a lower part of the crank case 21.

A third sound absorbing material 53 is provided on an inner surface of the third cover portion 31d, and a fourth sound absorbing material 54 and a fifth sound absorbing material 55 are provided on the front and back thereof on an inner surface of the fourth cover portion 31e. The thicknesses of the third to fifth sound absorbing materials are all thinner than the thickness t1 of the first sound absorbing material 51.

The sound absorbing materials 50 (51 to 55) are all made from a sheet-like urethane foam (sponge), and are respectively attached to the inner surface of the side cover.

The thickness of the first sound absorbing material 51 is about 8 mm, the thickness of the second sound absorbing material 52 is about 10 mm, and the thicknesses of the third to fifth sound absorbing materials are about 4 mm each.

Figure 5:
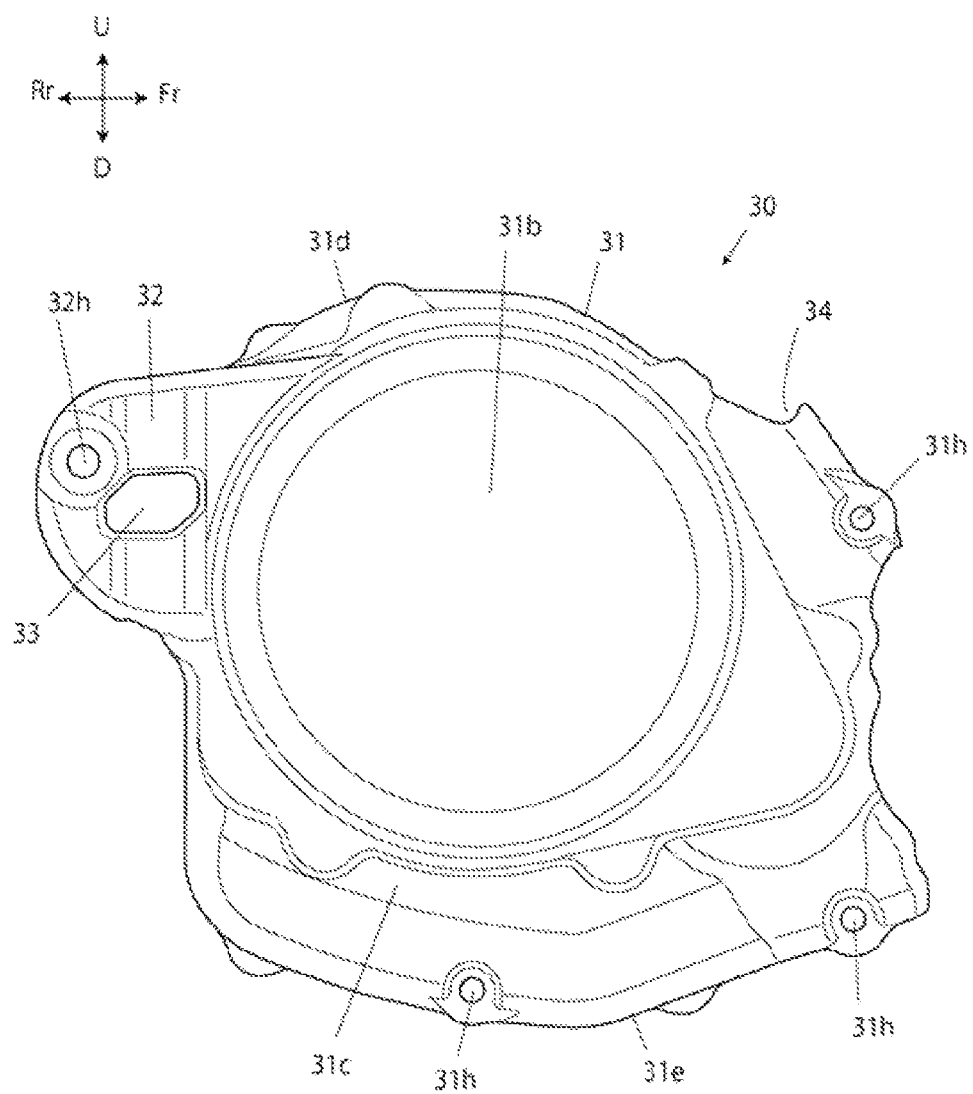
FIG. 5 is a right side view of a side cover.

As shown in FIGS. 5, 6A and 6B, a plurality of (three are shown) bolt insertion holes 31h are formed in a cover main body 31 of the side cover 30, and the cover main body 31 is fixed to the crankcase 21 by tightening a bolt 31f (FIG. 2) passing through the bolt insertion hole 31h to the crankcase 21. The cover main body 31 is fixed to the crankcase 21 by jointly tightening with a clutch cover 21d (FIG. 2) that covers a right side surface of the crankcase 21 with the bolt 31f. The bulge-out portion 21b, described above, in the embodiment is the bulge-out portion of the clutch cover 21d.

As shown in FIG. 3B, a bolt insertion hole 32h is formed in the extended portion 32 of the cover 30, and the extended portion 32 is fixed to the vehicle body frame 10 side by tightening a bolt 32b passing through the bolt insertion hole 32h to the vehicle body frame 10 side.

A diameter D2 of the bolt insertion hole 32h is greater than a diameter D1 of a shaft of the bolt 32b.

According to such configuration, the assembly of the side cover 30 is facilitated as an assembly error can be tolerated by a clearance C1 between the shaft of the bolt 32b and the bolt insertion hole 32h.

Reference numeral 32c indicates a collar.

As shown in FIG. 4, the brake switch 40 serving as an electrical component described above is fixed to the pivot frame 14 by an attachment bracket 60. A fixing portion (female screw hole) 64 of the extended portion 32 is provided on the attachment bracket 60.

According to such configuration, the attachment bracket 60 can be commonly used by the electrical component 40 and the side cover 30 thus reducing the number of parts, and at the same time, the fixing of the electrical component 40 and the extended portion 32 of the side cover can be carried out by effectively using the space S1 which front side is covered with the crankcase 21, the back side with the pivot frame 14 and the outer side with the extended portion 32.

The attachment bracket 60 includes a base portion 61 to be fixed to the pivot frame 14 with a bolt 61b, an arm portion 62 integrally extending toward the crankcase 21 from the base portion 61, and an electrical component attachment portion 63 bent toward the outer side in the vehicle width direction at a distal end of the arm portion 62, where the brake switch 40 serving as the electrical component is attached to the electrical component attachment portion 63.

The fixing portion (female screw hole) 64 of the extended portion 32 is provided on the arm portion 62.

A clip 65 for holding a wiring cord 41 of the electrical component 40 is provided on the attachment bracket 60 of the electrical component 40.

According to such configuration, the attachment of the electrical component 40 and the drawing of the wiring cord 41 are facilitated.

In FIG. 1, H refers to the steering wheel, T refers to the fuel tank, S refers the seat on which a driver sits, and ST refers to a foot placing step of the driver.

In FIG. 2, 70 is denoted on a brake pedal, which is turnably attached to the pivot frame 14 with a shaft 71. When a distal end 72c of the arm portion 72 extending forward from the shaft 71 is depressed with a foot of the driver and turned as shown with a virtual line, a rear wheel brake (not shown) is actuated by an actuation of a hydraulic cylinder 76 coupled to a back end 73, and furthermore, a rod 42 of the brake switch 40 coupled to the arm portion 72 with a link 75 is moved downward and turned ON thus turning ON a stop lamp (not shown) provided at the back part of the vehicle.

A lower cover 80 is fixed to the vehicle body frame 10, and covers the front part to the bottom part of the crankcase 21 and a water pump WP, thus protecting the front part and the bottom part of the crankcase 21 and the water pump WP.

The embodiment of the present invention has been described above, but the present invention is not limited to such embodiment, and can be appropriately modified within a scope of the gist of the present invention.

What is claimed is:

1. An engine side cover structure of a vehicle comprising:
   a vehicle body frame arranged between a front wheel and a rear wheel;
   an engine including a crankcase, and a cylinder extending upward from the crankcase, the engine being supported by the vehicle body frame; and
   a side cover covering a side of the crankcase; wherein
   the side cover includes a cover main body that covers the side of the crankcase, and an extended portion that extends backward from the cover main body; and
   the cover main body is fixed to the crankcase, and the extended portion is operatively attached to the vehicle body frame,
   wherein an exhaust tube, coupled to the cylinder, is arranged to extend in a front and back direction at an upper side of the crankcase,
   and wherein a cutout is provided in an upper part of the side cover, at a portion thereof adjacent to the exhaust tube.

2. The engine side cover structure of the vehicle according to claim 1, wherein the vehicle body frame includes,
   a head pipe that supports the front wheel by way of a front fork,
   a main tube that extends backward and downward from the head pipe, and
   a pivot frame that extends downward from a back end of the main tube;
   wherein the pivot frame is arranged to extend up and down at a back side of the crankcase, the extended portion of the side cover being operatively attached to the pivot frame.

3. The engine side cover structure of the vehicle according to claim 2, wherein a sound absorbing material is arranged between the side cover and the crankcase.

4. The engine side cover structure of the vehicle according to claim 3, wherein:

the crankcase includes a bulge-out portion that bulges out outward in a vehicle width direction;
   the side cover includes a first cover portion that covers the bulge-out portion and a second cover portion that covers at least one part of a periphery of the bulge-out portion;
   the sound absorbing material includes at least a first sound absorbing material provided on an inner surface of the first cover portion, and a second sound absorbing material provided on an inner surface of the second cover portion; and
   a thickness in a vehicle width direction of the first sound absorbing material is thinner than a thickness in the vehicle width direction of the second sound absorbing material.

5. The engine side cover structure of the vehicle according to claim 2, wherein a bolt insertion hole is formed in the extended portion of the side cover, and a bolt, passing through the bolt insertion hole, is tightened toward the vehicle body frame side to fix the extended portion in place, a diameter of the bolt insertion hole being greater than a diameter of a shaft of the bolt.

6. The engine side cover structure of the vehicle according to claim 1, wherein a sound absorbing material is arranged between the side cover and the crankcase.

7. The engine side cover structure of the vehicle according to claim 6, wherein:
   the crankcase includes a bulge-out portion that bulges out outward in a vehicle width direction;
   the side cover includes a first cover portion that covers the bulge-out portion and a second cover portion that covers at least one part of a periphery of the bulge-out portion;
   the sound absorbing material includes at least a first sound absorbing material provided on an inner surface of the first cover portion, and a second sound absorbing material provided on an inner surface of the second cover portion; and
   a thickness in a vehicle width direction of the first sound absorbing material is thinner than a thickness in the vehicle width direction of the second sound absorbing material.

8. The engine side cover structure of the vehicle according to claim 1, wherein a bolt insertion hole is formed in the extended portion of the side cover, and a bolt, passing through the bolt insertion hole, is tightened toward the vehicle body frame side to fix the extended portion in place, a diameter of the bolt insertion hole being greater than a diameter of a shaft of the bolt.

9. An engine side cover structure of a vehicle comprising:
   a vehicle body frame arranged between a front wheel and a rear wheel, wherein the vehicle body frame includes a head pipe that supports the front wheel by way of a front fork, a main tube that extends backward and downward from the head pipe, and a pivot frame that extends downward from a back end of the main tube;
   an engine including a crankcase, and a cylinder extending upward from the crankcase, the engine being supported by the vehicle body frame; and
   a side cover covering a side of the crankcase, the side cover comprising a cover main body that covers the side of the crankcase, and an extended portion that extends backward from the cover main body, wherein the cover main body is fixed to the crankcase, and the extended portion is operatively attached to the vehicle body frame;

an electrical component arranged in a space, wherein a front side of the space is covered with the crankcase, a back side of the space is covered with the pivot frame, and an outer side of the space is covered with the extended portion of the side cover at an area between the crankcase and the pivot frame, wherein an attachment bracket of the electrical component is fixed to the pivot frame, and wherein a fixing portion, for fixing the extended portion of the side cover, is provided on the attachment bracket.

10. The engine side cover structure of the vehicle according to claim 9, wherein an opening, to which the electrical component faces, is provided on a side surface of the extended portion of the side cover.

11. The engine side cover structure of the vehicle according to claim 10, wherein an exhaust tube coupled to the cylinder is arranged to extend in a front and back direction at an upper side of the crankcase, and a cutout is provided at a portion adjacent to the exhaust tube at an upper part of the side cover.

12. The engine side cover structure of the vehicle according to claim 9, wherein an exhaust tube coupled to the cylinder is arranged to extend in a front and back direction at an upper side of the crankcase, and a cutout is provided at a portion adjacent to the exhaust tube at an upper part of the side cover.

* * * * *